United States Patent [19]

Greene, Jr.

[11] 4,449,543
[45] May 22, 1984

[54] FLUID INJECTING METHOD AND APPARATUS

[76] Inventor: George J. Greene, Jr., 616 N. Eldridge, Houston, Tex. 77079

[21] Appl. No.: 445,677

[22] Filed: Nov. 30, 1982

Related U.S. Application Data

[63] Continuation-in-part of Ser. No. 253,242, Apr. 13, 1981, abandoned.

[51] Int. Cl.³ .................... F04B 13/00; B67D 5/08
[52] U.S. Cl. ........................................ 137/3; 137/9; 137/101.11; 137/564.5; 137/624.11; 417/279; 222/61; 222/642
[58] Field of Search ............... 137/3, 9, 101.11, 564.5, 137/624.11; 417/279, 392, 401; 222/61, 70, 249

[56] References Cited

U.S. PATENT DOCUMENTS

| | | | |
|---|---|---|---|
| 807,912 | 12/1905 | Desrumaux | 137/101.31 |
| 1,900,142 | 3/1933 | Wallace | 137/151 |
| 1,900,143 | 3/1933 | Wallace | 137/146 |
| 2,188,507 | 1/1940 | Harris | 222/209 |
| 2,323,341 | 7/1943 | McGill | 137/564.5 |
| 2,413,029 | 12/1946 | McFarland | 137/564.5 |
| 2,558,887 | 7/1951 | Tesiero | 222/61 |
| 2,606,690 | 8/1952 | Hansen | 222/1 |
| 2,889,084 | 6/1959 | Tour | 417/401 |
| 3,031,151 | 4/1962 | Marzili | 242/54 R |
| 3,109,452 | 11/1963 | Hicks, Jr. | 137/564.5 |
| 3,223,291 | 12/1965 | Thomas | 222/249 |
| 3,314,623 | 4/1967 | Blandino | 242/129.3 |
| 3,410,305 | 11/1968 | Hicks, Jr. | 137/564.5 |
| 3,998,239 | 12/1976 | Kruishoop | 137/564.5 |
| 4,257,437 | 3/1981 | Pearson | 137/8 |

Primary Examiner—Alan Cohan
Assistant Examiner—John A. Rivell
Attorney, Agent, or Firm—Vinson & Elkins

[57] ABSTRACT

A fluid injector suitable for injecting a fluid into a flowline having a fluid under pressure therein in which a piston divides the interior of a hollow body into a power chamber and a pumping chamber with a piston rod extending through the pumping chamber to the exterior of the body, fluid filling the pumping chamber, a discharge line from the pumping chamber through a valve to the flowline, and a supply line from the flowline to the power chamber, the valve in the supply line being controlled by the timed position of the piston. A method of injecting a fluid into a flowline including the steps of delivering pressure fluid from the flowline to a pressure responsive position displacement pumping means, delivering fluid from the pumping means through a valve to the flowline and controlling the valve to control the amount of fluid pumped responsive to the timed position of the pumping means.

12 Claims, 6 Drawing Figures

FLUID INJECTING METHOD AND APPARATUS

CROSS REFERENCE TO RELATED APPLICATION

This application is a continuation-in-part application of my prior co-pending application U.S. Ser. No. 253,242, filed Apr. 13, 1981 now abandoned.

BACKGROUND

In the oil and gas industry, gas from a flowline has long been used to drive a pump to inject a liquid into the flowline. Control of such liquid injectors has been accomplished by regulating the volume of gas delivered to the power end of the pump. Control difficulties are encountered if liquid and solids entrained in the gas are passed through the gas flow regulating valve.

There are many applications in which a very small quantity of liquid, e.g., a pint a day, is to be injected into a flowline. Examples of such applications are paraffin producing wells which can be produced without excessive paraffin deposit if a small but continuous injection of a liquid solvent can be maintained; also similar quantities of corrosion inhibitors and demulsifiers are injected into oil wells. Another large application is the introduction of mercaptans (odorant) into a gas flowline. Generally at the locations of such applications, no electricity is available and the only power fluid available is the fluid in the flowline to be treated. In some applications, it is desirable too inject a chemical in gaseous form into a flowline or process vessel.

Metering pumps for injecting small amounts of a liquid into a flowline achieve low flow rates by reducing the size of the pumping end of the injector so that only a small amount of liquid is delivered with each stroke. Considerable difficulty has been encountered with the check valves failing to close completely and the packing being sufficiently resilient to accommodate the stroke volume to thereby cause the injector to cycle without delivering any liquid. Also difficulties have been encountered in injecting liquids containing solids. Such solids prevent the check valves from completely closing and thus prevent delivery of a relatively continuous supply of liquid.

Combined with the problem of delivering chemical from the injector is an even more serious problem of maintaining a preset flow rate of working fluid into the power end of the injector. To obtain low chemical injection rates (e.g., 1 pt./day) the metering valve for the working fluid must be constricted to such an extent that flow blockage will occur from contaminants, also the working fluid flow rate will change drastically from day to night due to temperature changes and corresponding changes in working fluid viscosity; this changes the chemical injection rate.

Utilizing fluid pressure from a flowline to power an injector to pump into the flowline is shown in U.S. Pat. Nos. 3,410,305; 3,065,679; 2,563,211; and 2,413,029. U.S. Pat. No. 3,998,239 discloses an apparatus for dosing a gas into a flowline using pressure in the line to charge the dosing compartment. None of such prior art devices have been suitable for accurately controlled, relatively low flowrate of injection of a liquid into a flowline.

Injection of a chemical in gaseous form in exact amounts and particularly at low flow rates has not been done acceptably in the past.

SUMMARY

The present invention relates to an improved method of an apparatus for injection of a fluid into a flowline. In one form the improved apparatus includes a hollow body, pressure responsive means dividing the body into a power chamber and a pumping chamber and providing a positive displacement pumping means, a supply of fluid to be injected into a flowline in the pumping chamber, means connecting the flowline to the power chamber, a valve controlled line extending from the pumping chamber to the flowline, the valvve in said line being controlled by the timed position of the pumping means. The improved method includes the steps of withdrawing pressure fluid from a flowline and delivering such fluid to a pressure responsive means to power a pumping means, pumping fluid through a valve controlled line to the flowline with the valve being controlled by the timed position of the pumping means.

An object of the present invention is to provide an improved method of an apparatus for injecting liquid into a flowline in relatively small quantities with precise accuracy using the pressure fluid in the flowline as the power fluid.

Another object is to provide an improved liquid injection into a flowline using a minimum of energy.

A further object is to provide improved liquid injection method and apparatus which has a minimum of moving parts and in which the moving seals have such minimal surface motion (i.e., one foot in several days) that seal wear is virtually eliminated.

Still another object is to provide an improved liquid injector which accurately delivers a preselected low flow rate of liquid unaffected by phase changes, from liquid to gas or to a two phase condition of the power fluid or by changes in temperature or pressure in the flowline into which it is injecting liquid.

Another object of the invention is to provide a system which will inject liquid chemicals at a precise rate completely unaffected by changes in viscosity or the presence of solids within the chemical being injected.

A still further object of this invention is to provide a fluid powered chemical injector in which the injection rate is precisely controlled by a mechanical device completely unaffected by the environment, conditions of the working fluid, or pumped chemical and the energy for the mechanical control device is derived entirely from the working fluid.

Another object of the invention is to provide a system which will inject liquid chemicals at a precise rate completely unaffected by changes in viscosity or the presence of solids within the chemical being injected.

A further object of the present invention is to provide an improved method and apparatus for injecting a gaseous chemical at a precise rate into a flowline or into process equipment.

BRIEF DESCRIPTION OF THE DRAWINGS

These and other objects and advantages are hereinafter set forth and explained with reference to the drawings wherein.

DESCRIPTION OF THE PREFERRED EMBODIMENTS

Figure 1:
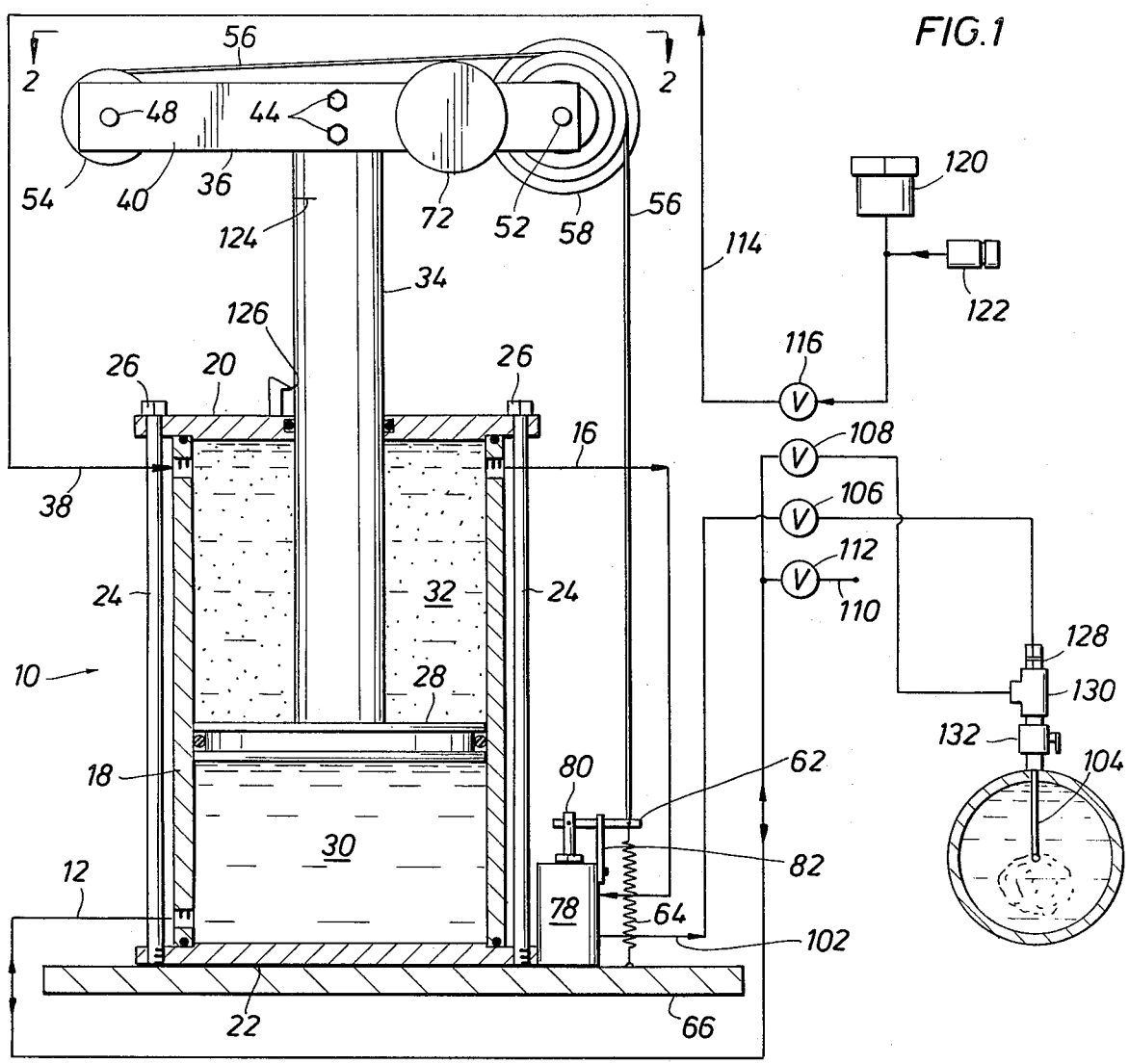
FIG. 1 is a combined sectional view and flow diagram of the improved injector of the present invention.
Figure 2:
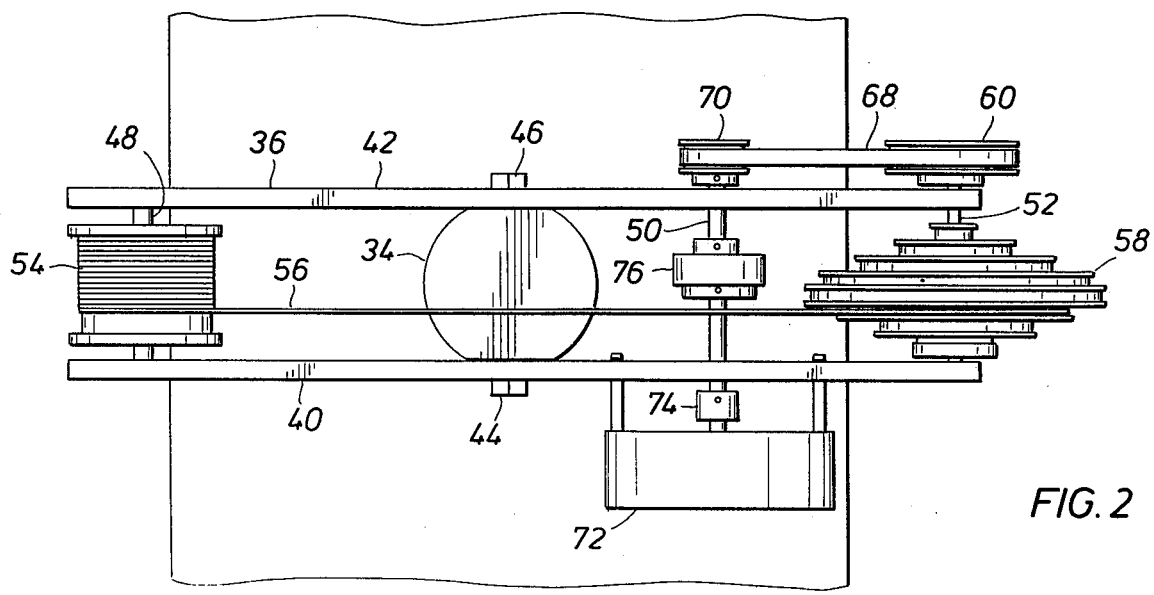
FIG. 2 is a plan view of the injector apparatus in FIG. 1 to illustrate the position timing apparatus.

The improved injector apparatus shown in FIGS. 1 and 2 includes injector 10 which is connected by line 12 to flowline 14 for the delivery of pressure fluid to injector 10 as a power fluid and also is connected by line 16 to flowline 14 for the injection of fluid (liquid or gas) pumped by injector 10. Injector 10 includes hollow or tubular body 18 having end closures 20 and 22 which are secured thereon as shown by studs 24 and nuts 26 with piston 28 positioned within body 18 for reciprocation therein responsive to fluid pressures. Piston 28 divides the interior of body 18 into power chamber 30 and pumping chamber 32 with piston rod 34 being secured to piston 28, extending through pumping chamber 32 and end closure 20 and having yoke 36 secured to its outer end as shown. Line 38 connects into pumping chamber 32 for filling of pumping chamber 32.

Piston 28 functions as a pressure responsive power means and as a positive displacement pumping means. Other apparatus which performs these functions either as a single device, such as a metal pressure responsive bellows, or as two interconnected devices may be used. The effective pressure area of the pumping means should be less than the effective pressure area of the power means to assure that friction will be overcome and that the fluid will be pumped to and injected into flowline 14. Piston rod 34 is thus of a preselected size to provide this difference in effective pressure areas. It is contemplated that such pumping and power means may be separate interconnected devices provided that the differential in effective pressure areas is maintained and that the pumping means is a positive displacement device. Also, some means is to be provided on the exterior of such means which moves directly with said pumping means.

As shown in FIGS. 1 and 2, yoke 36 includes beams 40 and 42 secured to the end of piston rod 34 by bolts 44 and nuts 46, with shafts 48, 50 and 52 spanning the space between and mounted in beams 40 and 42. Spring driven cable reel 54 is mounted for rotation on shaft 48 with cable 56, such as a 1/16th inch stainless steel cable, wound thereon and extending to a preselected one of the stepped surfaces on multiple sheave 58. Reel 54 is biased by its spring to rewind cable 56 thereon. Sheave 58 is secured to shaft 52. Suitable bearings (not shown) are provided around shaft 52 in beams 40 and 42 for mounting shaft 52 therein. Timing sheave 60 is secured to the portion of shaft 52 extending beyond beam 42. Cable 56 is wound approximately one and one-quarter turns around the preselected surface of sheave 58 and connects to arm 62 to control flow of fluid pumped by injector 10 as hereinafter more fully explained. Spring 64 connects from base plate 66 to arm 62 to bias the outer end of arm 62 downwardly. Cable 56 is wound on sheave 58 sufficiently tight so that it does not slip thereon but moves only with the rotation of sheave 58.

The rotation of sheave 58 is controlled by the connection of timing belt 68 which connects timing sheave 60 to timing sheave 70 which is secured on shaft 50. The rotation of shaft 50 is controlled by a suitable timing brake means, such as clock escapement apparatus 72. Bushing 74 connects clock apparatus 72 to shaft 50 and overrunning clutch 76 is connected in shaft 50 between beams 40 and 42 so that no reverse rotation is imparted to clock apparatus 72.

Clock escapement apparatus 72 may be any suitable timing device, such as a spring powered clock having a typical clock escapement mechanism with the spring removed as piston 18 and spring 64 provide the force necessary to cause the apparatus 72 to run at its preselected speed, which may be for example, one revolution each day. The diameter of the surface on sheave 58 on which cable 56 is wound, the rate of rotation of apparatus 72 and the relative sizes of sheaves 70 and 60 determine the rate at which fluid is injected into flowline 14. The cable sheave timing apparatus introduces a timed position factor in controlling the rate of fluid injection and such control is achieved by control of valve 78 which is connected in line 16.

Figure 4:
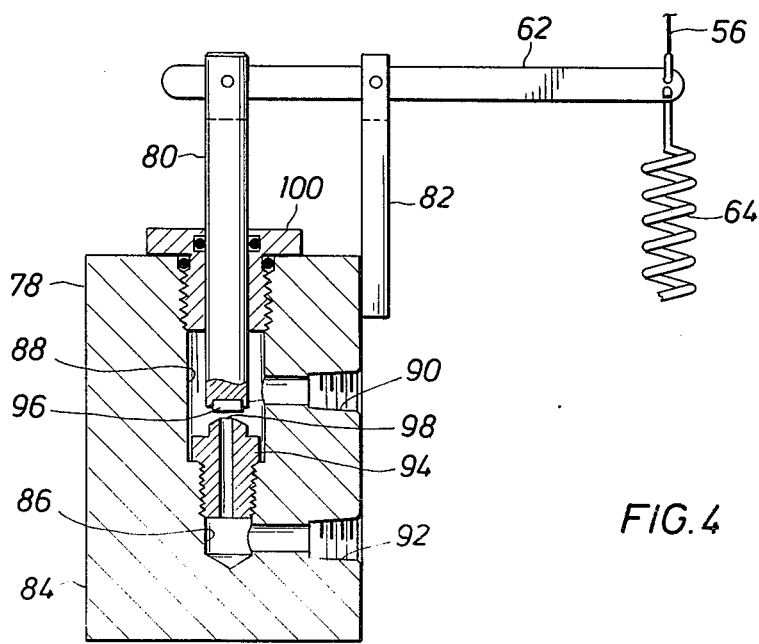
FIG. 4 is a sectional view of the discharge valve shown in FIGS. 1 and 3.

Valve 78 is mounted on base plate 66 and includes operator stem 80 extending upwardly therefrom. Arm 62 is pivotally mounted by bracket 82 and its inner end is connected to stem 80 as shown in FIGS. 1 and 4. The force exerted by spring 64 on arm 62 tends to open valve 78 to flow of fluid discharged from pumping chamber 32.

Valve 78, as best seen in FIG. 4, includes body 84 having bore 86 and counterbore 88 with inlet port 90 communicating with counterbore 88 and discharge port 92 communicating with bore 86. Nozzle 94 is threaded into bore 86 and valve member 96, which is mounted on stem 80, is movable to seat on and be spaced from seat 98 at the end of nozzle 94 with the movement of stem 80 to control the flow therethrough. Bushing 100 with suitable seals, surrounds stem 80 and is threaded into counterbore 88. Valve member 96 is a resilient or soft seating material suitably secured in a recess in the inner end of stem 80 as shown.

Line 102 conducts fluid from discharge port 92 to injector tube 104 which extends into flowline 14 and valve 106 is positioned in line 102 to allow line 102 to be closed during filling as hereinafter described. Valve 108 is positioned in line 12 and vent line 110 having valve 112 therein connects into line 12 as shown. Line 114 connects from valve 116 to line 38 and fill port 118 and thus into pumping chamber 32. Alternate filling apparatus are both connected to valve 116 and such apparatus includes elevated tank or reservoir 120 and quick connecting coupling 122 for connecting to a pressure source to allow pressure filling of chamber 32. Mark 124 on piston rod 34 coacts with pointer 126 to indicate that pumping chamber 32 is completely full of the fluid which is to be injected into flowline 14.

Injector tube 104 extends through packing gland 128, tee 130 and ball valve 132 into the interior of flowline 14. Pressure fluid flows through valve 132 and tee 130 into line 12. To isolate the injector from the interior of flowline 14, injector tube 104 may be withdrawn through valve 132 and then valve 132 may be closed.

In operation, pumping chamber 32 is filled with liquid through lines 114 and 38. Valves 116 and 112 are open and valves 106 and 108 are closed during initial filling and when filling is by gravity flow. If pressure filling through coupling 122 is to be used, then valves 116 and 108 are open and valves 112 and 106 are closed provided that sufficient pressure is available to overcome pressure in power chamber 32. Valve 106 should always be closed before commencing filling. For gravity flow filling, valve 108 is closed and then valve 112 is opened to vent chamber 30 and then valve 116 is opened. During filing, cable 56 is rewound on cable reel 54 since it is spring biased to wind the cable thereon and with clutch 76 is shaft 50 sheave 58 rotates freely in the reverse direction as the movement of piston 28 inward allows such rewinding.

Gas filling may proceed with flow from a pressure source or pump as with pressure filling described above for liquid pressure filling. This pressures the fluid so that it is not vented and also maintain the pressure in chamber 30 so that when filling of chamber 32 is complete piston 28 is not repositioned by an increase of pressure in chamber 32 which would happen if it is vented for filling.

With chamber 32 filled, valve 116 and 112 are closed and valves 106, 108 and 132 are opened. Cable 56 is positioned on the preselected surface of multiple sheave 58 and is taut from arm 62 to reel 54 so that arm 62 is initially held upward against spring 64. As escapement apparatus 72 allows sheave 58 to rotate, cable 56 is gradually pulled from reel 54 allowing spring 64 to pivot arm 62 sufficiently to raise valve member 96 above seat 98 and a small amount of liquid flows through nozzle 94. This allows piston 28 to move upward tightening cable 56 and closing valve 78. Since the rate of rotation of timing apparatus 72 is preselected and the timing belt connection between sheaves 70 and 60 controls the rate of rotation of sheave 58, the rate of payout of cable 56 is thus predetermined and since it controls the flow through valve 78, the amount of liquid injected into flowline 14 is accurately controlled by the interaction of the piston movement, the cable payout and the opening and closing of valve 78.

Figure 3:
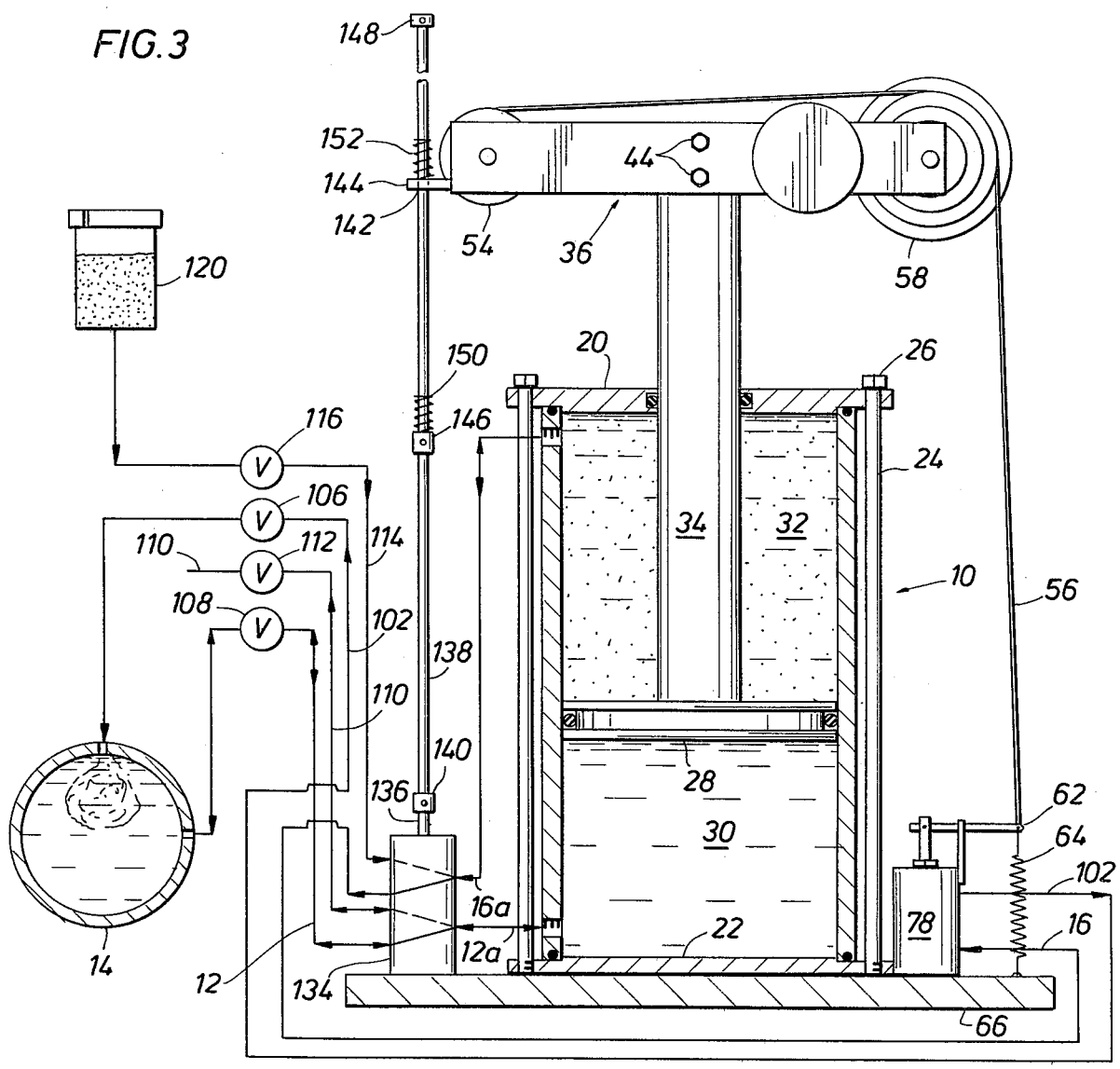
FIG. 3 is another view similar to FIG. 1 but showing the flow diagram for automatic refilling of the pumping chamber.

The apparatus shown in FIG. 3 is substantially the same as the apparatus shown in FIGS. 1 and 2 and the same components are given the same numbers. The difference shown in FIG. 3 is the automatic filling operation. Such automatic liquid filling is controlled by snap-action spool valve 134 which is mounted on base plate 66. Spool valve 134 has upwardly extending stem 136 which is connected to arm 138 by coupling 140. Arm 138 extends up through opening 142 in plate 144, which is secured to yoke 36. Sleeve 146 is secured to arm 138 at the level which, when reached by plate 144 during filling, causes valve 134 to snap to its down position to start injection. Sleeve 148 is secured to arm 138 above plate 144 at the level which, when reached by plate 144 during injection, causes valve 134 to snap to its up position to start filling. Spring 150 is positioned on arm 138 between sleeve 146 and plate 144 and spring 152 is positioned on arm 138 between sleeve 146 and plate 144. Springs 150 and 152 provide sufficient force before they are fully compressed to cause valve 134 to reverse its position in a snap action.

Figure 5:
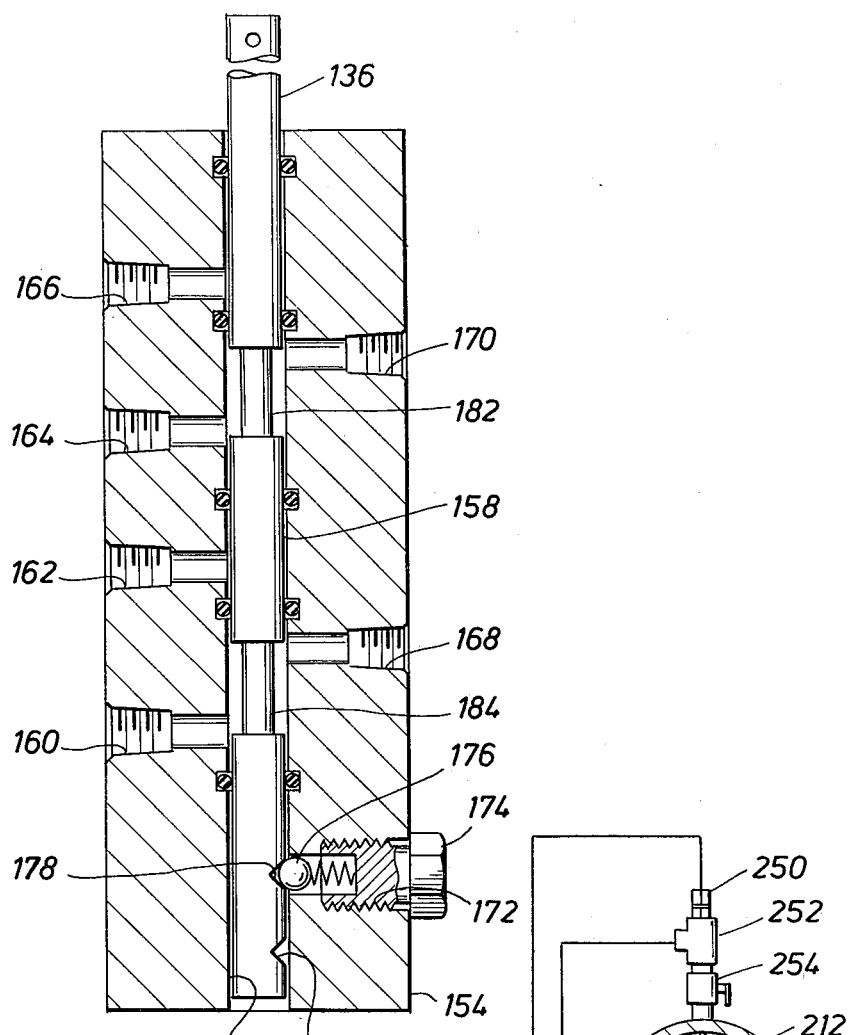
FIG. 5 is a sectional view of the spool valve shown in FIG. 3.

Snap-action valve 134, as best shown in FIG. 5, includes body 154 with bore 156 providing the cylindrical recess in which valve spool 158 is positioned. Stem 136 connects or is an integral extension of the upper end of spool 158. Ports 160, 162, 164 and 166 in body 154 communicate with bore 156. Port 168 in body 154 communicates with bore 156 at a position between ports 160 and 162 and port 170 in body 154 communicates with bore 156 at a position between ports 164 and 166. As shown, seals between bore 156 and spool 158, such as O-rings, are provided around bore 156 between each of the ports, above port 166 and below port 160. Opening 172 in body 154 extends into bore 156 below the lower seal and plug 174 is mounted therein to position spring loaded ball 176 in bore 156 for engagement in upper groove 178 in spool 158 when it is in its lower position and for engagement in lower groove 180 in spool 158 when it is in its upper position. The engagement of ball 176 in these grooves prevents accidental shifting of spool 178 and assures that when it starts to shift that there is sufficient compression of one of the springs on arm 138 to assure that there is a smooth quick movement to the opposite spool position. Spool 178 includes upper reduced section 182 and lower reduced section 184. When spool 178 is in its lower position, as shown in FIG. 5, ports 160 and 168 and ports 64 and 170 are in communication with each other, respectively, and injector 10 is in its pumping mode. The shifting of spool 158 to its upper position puts ports 162 and 168 and ports 166 and 170 in communication with each other, respectively, for filling of pumping chamber 32 with the injection liquid. With spool 158 in filling mode and valves 106, 108, 112 and 116 open, liquid from elevated reservoir 120 flows through valve 116, line 114, port 166 to port 170 and line 16a into pumping chamber 32. Pressure in power chamber 30 is vented through line 12a, port 168 to port 162, line 110 and valve 112. When chamber 32 is full, plate 144 engages spring 150 and compresses it until sufficient force is developed to shift spool 158 downward so that pressure fluid is delivered from flowline 14 through valve 108, line 12, port 160 to 168 and line 12a to chamber 30. Liquid pumped from chamber 32 flows through line 16a, port 170 to port 164, line 16, valve 78, line 102 and valve 106 into flowline 14. The inclusion of clutch 76 between timing apparatus 72 and sheave 70 allows reel 54 to wind cable 56 thereon with the downward movement of piston 28 and yoke 36 during filling.

Figure 6:
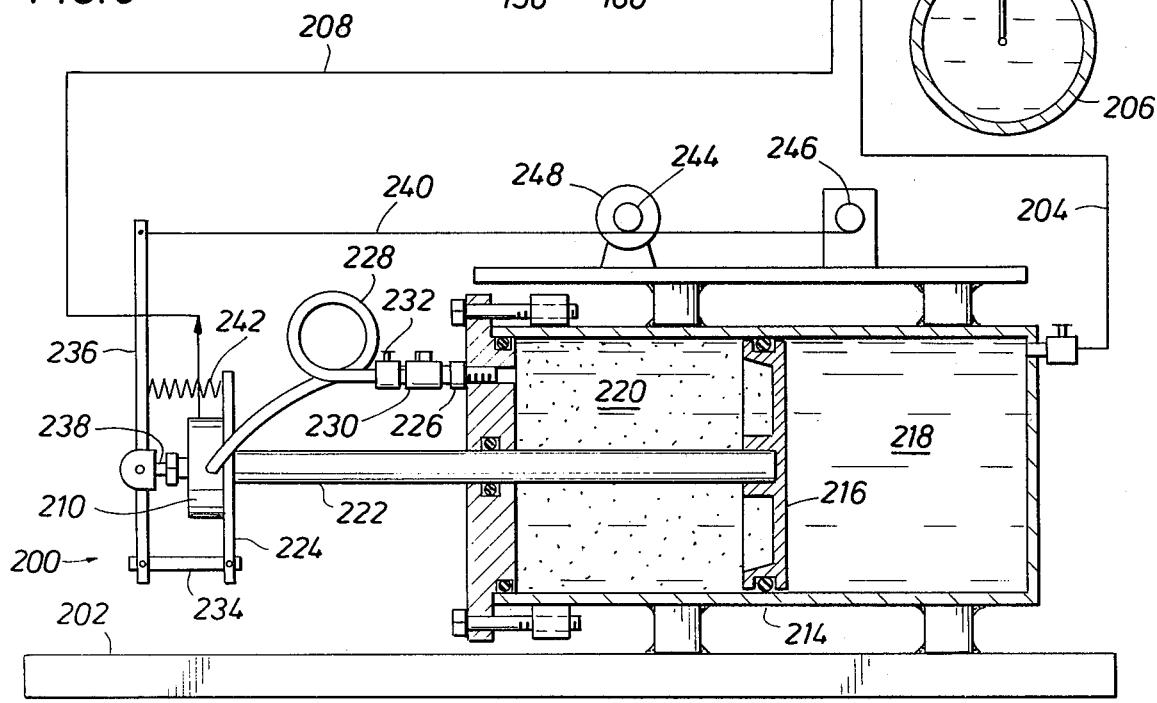
FIG. 6 is a schematic illustration of a modified form of injector of the present invention.

The modified form of the present invention shown in FIG. 6 includes injector 200 supported on base plate 202 with line 204 connecting from flowline 206 to injector 200 and discharge line 208 connected from valve 210 to injector tube 212 in flowline 206. Injector 200 includes hollow body 214 with piston 216 therein dividing the interior into power chamber 218 and pumping chamber 220 and piston rod 222 is secured to piston 216 and extends through chamber 220 to reduce its effective pressure area and has plate 224 secured to its other end which is on the exterior of body 214. Plug 226 connects into chamber 220 and line 228, which is connected to fill fitting 230 through valve 232, is flexible and connects to valve 210 mounted on plate 224. Link 234 is secured to plate 224 and has arm 236 pivotally mounted thereon. Arm 236 is connected to valve stem 238 of valve 210. Cable 240 is connected to the outer end of arm 236 and is biased to the left as shown in FIG. 6 by compression spring 242. Cable 240 extends from arm 236 is wound around sheave 244 and extends to spring driven cable reel 246. Timing apparatus 248 is connected to allow drive sheave 244 to rotate at a preselected rate so that cable 240 is fed out therefrom at the preselected rete. Thus, as previously described, the rate of movement of piston 216 controls the rate of pumping of liquid into flowline 206 by controlling valve 210. Line 208 is flexible to allow for the movement of valve 210. Injector tube 212 extends through packing gland 250, tee 252 and ball valve 254. The operation of injector 200 is substantially the same as injector 10 previously described.

The energy savings, in consumed working fluid, exhibited by the fluid injector herein described is appreciably less than all other injectors now being marketed. This is particularly true when a compressible gas is utilized to drive the injector. Conventional injectors utilize a large ratio of power piston to injector plunger size in order to inject small quantities of fluid into a flowing stream. This large operating ratio is mandatory since previously the only timing device utilized for the stroke rate of a fluid driven pump was to meter the working fluid through a small valve. Since a practical lower limit of orifice size is dictated by the orifice blockage due to solid contaminants in the gas stream, expansion or contractions of the metal valve parts due to temperature changes, and entrainment of liquid droplets in the gas stream, the orifice must be fairly large and will therefore pass a significant quantity of gas. Therefore, the only means of slowing the plunger stroke is to have a large volume within the power chamber. Since the gas within the power chamber is dumped each time a stroke is completed, a large volume of gas is consumed for each delivery of chemical into the system. On low chemical delivery rate pumps the typical ratios between the power piston and pumping plunger is in excess of 200:1. The reason for the tremendous quantity of gas wasted in the conventional injector is that the power gas pressure required to inject the chemical into the pipeline is only a small fraction of that required to operate the pump. Due to internal friction, operation of the piston cycling valve, and return of the piston and plunger at the end of each pumping stroke.

The chemical injector described in this invention is approximately 90% efficient at all conditions of pressure and injection rate. Other fluid powered pumps now being marketed for low delivery rates at low pressures (i.e., 200 psi injection pressures) will exhibit energy efficiencies of less than 30% and some will be as low as 2%.

What is claimed is:
1. A fluid injector, comprising
pressure responsive power means,
means for delivering a pressure fluid to said power means
a rigid plate positive displacement pumping means connected to be powered by said power means and positioned to mechanically separate the pressure fluid delivered to said power means from the fluid to be injected,
a discharge line extending from said pumping means,
a valve having an operator and connected in said discharge line, and
timing means mechanically interconnecting the valve operator to the rigid plate pumping means to control the rate of pumping of fluid through said discharge line.
2. A fluid injector according to claim 1, wherein
a piston is reciprocably mounted in a cylinder and functions as said power means and said pumping means, and
a piston rod extends from said piston on the pumping side thereof whereby the effective pressure area on the power side of said piston is greater than the effective pressure area on the pumping side of said piston.
3. A fluid injector according to claim 1 including
valve means controlling said fluid delivering means and providing in one position an open communication to said pumping means from a source of fluid to be pumped, and
means for shifting said valve means between positions to allow pumping in one position and to allow filling of the pumping means with fluid to be pumped.
4. A fluid injector according to claim 3 wherein said means for shifting said valve means includes
an extension from the operator of the valve means connected to said pumping means to shift said valve means at the end of each pumping stroke and each filling stroke.
5. A fluid injector according to claim 1 wherein said timing connecting means includes
a mechanical connection to said pumping means, and
a cable connecting from said mechanical connection to said valve operator,
said operator closing said valve responsive to pumping movement of said mechanical connection,
said timing means paying out said cable at a preselected rate to allow said valve to open sufficiently to pump fluid at a preselected rate.
6. A fluid injector according to claim 5 wherein said timing means includes
a sheave around which said cable is wound tightly, and
a timing brake connected to limit the rate of rotation of said sheave to thereby control the rate of movement of the cable.
7. A liquid injector according to claim 2 wherein said timing connecting means includes
a mechanical connection to said pumping means, and
a cable connecting from said mechanical connection to said valve operator,
said operator closing said valve responsive to pumping movement of said mechanical connection, and
said timing means paying out said cable at a preselected rate to allow said valve to open sufficiently to pump fluid at a preselected rate.
8. A fluid injector according to claim 7 including
a yoke secured to the outer end of said piston rod,
a spring driven cable reel rotatably supported on said yoke, and
a sheave rotatably supported on said yoke and having a plurality of different diameter cable receiving surfaces,
said cable being wound around a preselected one of said surfaces,
said timing means connected to limit the rate of rotation of said sheave to thereby control the rate of payout of said cable.
9. A fluid injector according to claim 8 including
an over running clutch connected between said timing means and said sheave to allow free rotation of said sheave and winding of said cable on said reel during filling of the pumping means with fluid to be pumped.
10. A fluid injector comprising
a hollow body,
a piston movable in said body and having a seal between its exterior and the interior of the body,
said piston dividing the interior of said body into a power chamber and pumping chamber,
a piston rod connected to said piston and extending through said pumping chamber to the exterior of said body,
an opening through said body into said pumping chamber,
an opening through said body into said power chamber, a valve having an operator and connected to said pumping chamber opening to control flow therefrom, means biasing the operator toward open position, a yoke connected to said piston rod on the exterior of said body, means connecting from said yoke to said operator whereby movement of said piston moving said piston rod outward through said body moves said operator to closed position, and timing means interposed in said connecting means between said yoke and said operator to control the rate of pumping of fluid from said pumping chamber by controlling the rate of outward movement of said yoke.

11. The method of injecting a fluid into a flowline including the steps of delivering pressure fluid from the flowline to a pressure responsive positive displacement pumping means, supplying fluid to be injected to said pumping means, mechanically closing flow of fluid from said pumping means to said flowline responsive to excessive rate of movement of the pumping means and mechanically opening flow of fluid from said pumping means to said flowline responsive to insufficient rate of movement of the pumping means by mechanically interconnecting the pumping means, the controlling means and a timing means, and delivering fluid pumped by said pumping means to said flowline.

12. The method according to claim 11 wherein a mechanical connection is provided from the pumping means to the control means and the timing means and including the steps of paying out the mechanical connection from the timing means at a preselected rate to lengthen the mechanical interconnecting means while movement of said pumping means effectively shortens the mechanical interconnecting means.

* * * * *